United States Patent

Kitajima et al.

Patent Number: 5,179,287
Date of Patent: Jan. 12, 1993

[54] DISPLACEMENT SENSOR AND POSITIONER

[75] Inventors: Kourou Kitajima, Osaka; Hiroshi Sekii, Ibaraki, both of Japan

[73] Assignee: Omron Corporation, Kyoto, Japan

[21] Appl. No.: 720,398

[22] Filed: Jun. 25, 1991

[30] Foreign Application Priority Data

Jul. 6, 1990 [JP] Japan ................................ 2-179831
Oct. 4, 1990 [JP] Japan ................................ 2-268128

[51] Int. Cl.$^5$ ............................................. G01C 3/00
[52] U.S. Cl. ................................. 250/561; 356/1; 250/201.4
[58] Field of Search ................... 250/61, 201.4; 356/1, 356/4

[56] References Cited

U.S. PATENT DOCUMENTS

| | | | |
|---|---|---|---|
| 4,589,773 | 5/1986 | Ido et al. | 356/1 |
| 4,884,888 | 12/1989 | Butefisch | 356/1 |
| 4,971,443 | 11/1990 | Koyagi | 356/1 |
| 5,024,529 | 6/1991 | Svetkoff et al. | 356/1 |

Primary Examiner—Janice A. Howell
Assistant Examiner—Don Wong
Attorney, Agent, or Firm—Dickstein, Shapiro & Morin

[57] ABSTRACT

The invention provides a displacement sensor comprising a light-emitting element for projecting a detection light towards an object in a substantially perpendicular direction, a condensing element for condensing a reflected light from the object, and a position sensitive device with its light-receiving surface disposed in parallel with the axis of the detection light. A positioning apparatus employing the above displacement sensor is also disclosed.

18 Claims, 9 Drawing Sheets

DISPLACEMENT SENSOR AND POSITIONER

FIELD OF THE INVENTION

The present invention relates, in one aspect, to a displacement sensor including a position sensitive device and, in another aspect, to a contactless positioner utilizing said displacement sensor.

BACKGROUND OF THE INVENTION

There is known a displacement sensor utilizing a position sensitive device (hereinafter referred to briefly as PSD). Such a sensor is shown at 51 in FIG. 10 of the drawings accompanying this specification. This displacement sensor generally comprises a sensor head 52 housing a light-emitting element 53, which may be a light-emitting diode (LED) or a semiconductor laser, and a projection lens 54 on the light emission side and a condenser 55 and a PSD 56 on the light reception side. The operating principle of this sensor is that a detection light beam 58 from said light-emitting element 53 is obliquely incident on the object 57 and the light 59 reflected therefrom is condensed by said condenser 55 and received by the PSD 56. It is so arranged that the axis of the detection light beam 58 is at right angles ($\theta = 90°$) with the light axis of the condenser 55. Since, in this sensor 51, the amount of displacement of the object 57 is proportional to the amount of shift in the point of incidence on the light-receiving surface of the PSD 56, the signal output of the PSD is linearly dependent on the amount of displacement of the object 57.

Figure 10:
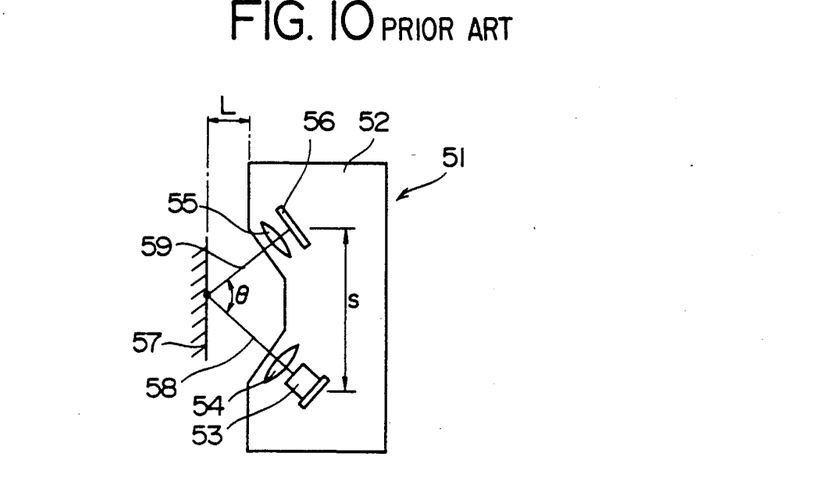
FIG. 10 is a schematic view showing one conventional displacement sensor.

In this sensor 51, however, since both the light-emitting element 53 and the PSD 56 are obliquely disposed with respect to the surface of the object 57, the distance s between the light-emitting element 53 and the PSD 56 is greater than the detection distance L so that the bulk of the sensor head 52 is increased of necessity.

Figure 11:
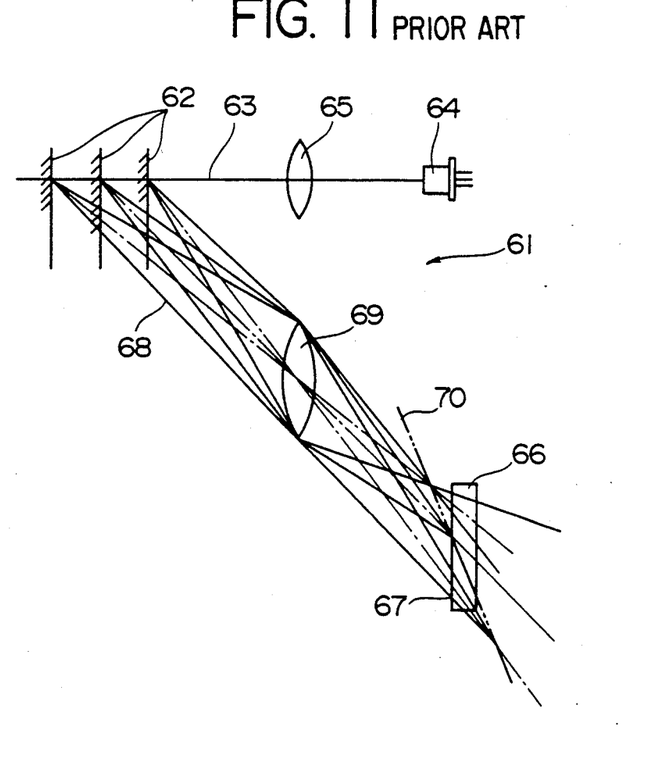
FIG. 11 is a schematic view showing another known displacement sensor.

Illustrated in FIG. 11 is another known displacement sensor 61, wherein a light-emitting element 64 and a projecting lens 65 are disposed so as to project a detection light 63 perpendicularly towards the object 62 and, with the light-receiving surface of a PSD 66 being disposed perpendicularly with respect to the axis of a detection light beam 63, a condenser 69 for focusing a reflected light 68 on said PSD 66 is disposed in parallel with the axis of the detection light beam 63.

In this displacement sensor 61, the axis of the detection light beam 63 is at right angles with the light-receiving surface 67 of the PSD 66, the amount of shift in the point of light incidence on the light-receiving surface 67 of PSD 66 is not proportional to the amount of displacement of the object 62 so that the signal output of the PSD is not linearly dependent on the amount of displacement of the object 62, thus requiring a correcting circuit. Moreover, the focal plane, indicated at 70, which is formed by the reflected rays 68 on focusing by the condenser 69, does not coincide with the light-receiving surface 67 of PSD 66 as seen in FIG. 11, so that the reflected light 68 from the surface of said object 62 cannot always be focused on the light-receiving surface 67 of PSD 66.

Figure 12:
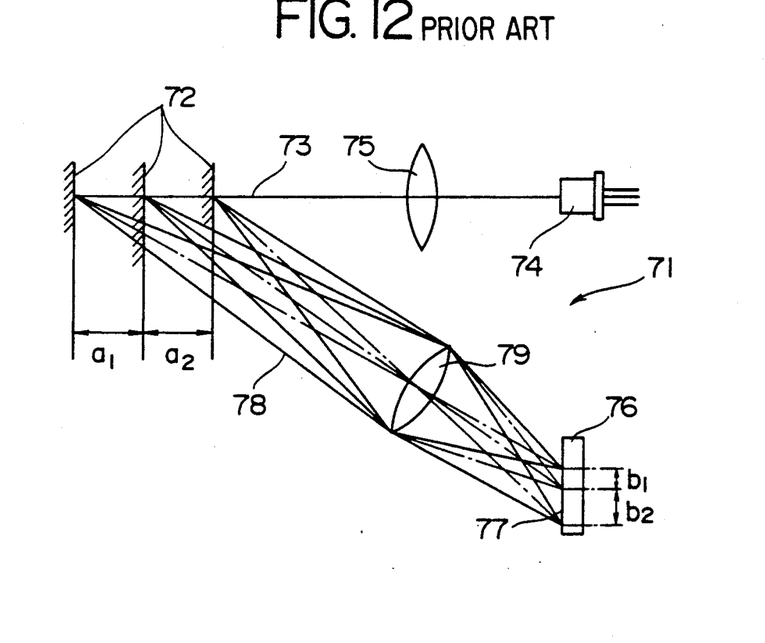
FIG. 12 is a schematic view showing still another known displacement sensor.

FIG. 12 is a schematic view showing still another known displacement sensor 71. In this displacement sensor 71, a light-emitting element 74 and a projecting lens 75 are disposed so as to project a detection light beam 73 in a perpendicular direction with respect to the surface of an object 72 and, with the light-receiving surface of a PSD 76 being disposed perpendicularly with respect to the axis of a detection light beam 73, a condenser 79 is disposed in an inclined position so that a reflected light 78 from the object 72 is invariably incident on the light-receiving surface 77 of a PSD 76. However, even in this displacement sensor 71, where the axis of the detection light 73 is perpendicular to the light-receiving surface 77 of PSD 76, no linearly displacement-dependent signal output can be obtained from the PSD 76 as shown in FIG. 12 because, assuming that the object 72 is displaced by $a_1$ and $a_2$, the amounts of shift of focus, $b_1$ and $b_2$, on the light-receiving surface 77 of PSD 76 are not proportional, viz.

$$b_1/a_1 \neq b_2/a_2.$$

Figure 13:
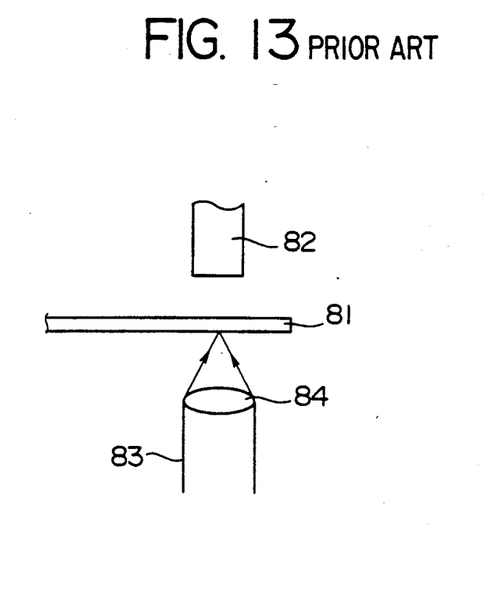
FIG. 13 is a schematic view showing a conventional positioning apparatus for the magnetic head.

The technological background of positioning devices is now described briefly. FIG. 13 shows a schema for positioning a magnetic head 82 with respect to a disk 81 in an optical/magnetic disk system. This is a positioning system known as the focus error system. Here, a laser light 83 from a write laser diode is condensed by optics 84 onto the disk 81 to detect the distance from the disk 81 from the amount of defocus of the laser light 83 and this detection signal is fed back to the magnetic head 82 to maintain the magnetic head 82 at a predetermined distance from the disk 81.

In such a focus error system, however, there are limits to the range of in-focus so that the disk and laser diode must be exactly positioned beforehand. For this reason, high assembling accuracy is required for the laser diode and other devices and the assembly of a magnetic disk involves a time-consuming operation.

Figure 14:
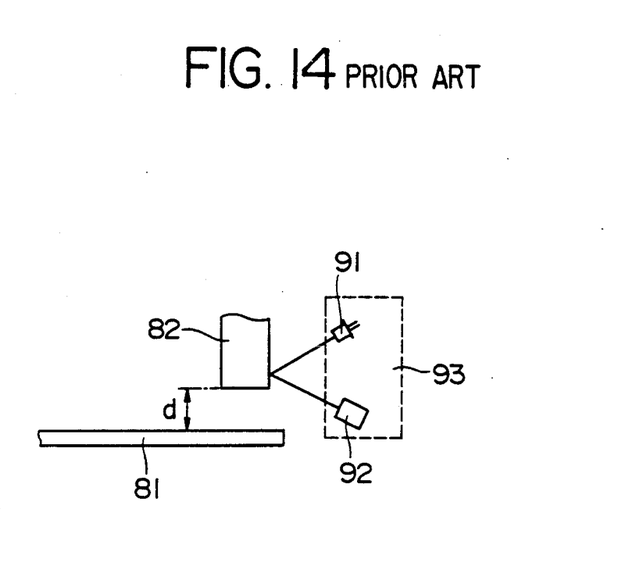
FIG. 14 is a schematic view showing a conventional positioning apparatus for the magnetic head.

The system for positioning a magnetic head as shown in FIG. 14 detects the absolute position of a magnetic head 82 with a displacement sensor 93, which comprises a light-emitting element 91 and a PSD 92 such as those as illustrated in FIG. 10, and calcualtes the distance d between the magnetic head 82 and the disk 81 to thereby indirectly detect the position of the magnetic head 82.

Since, in this system, the distance d between the magnetic head 82 and the disk 81 is determined indirectly by calculation, the system has the drawback of fairly large positioning error.

In the impact dot printer, the printing head must be positioned with respect to the printing paper. In the conventional practice, the printing head is once advanced into contact with the paper for positioning and, then, carried back away from the paper over a predetermined distance to set the head in a necessary position relative to the paper.

However, this system involves a large-stroke movement of advancing the printing head into contact with the paper and carrying it back and requires a device for sensing the timing of the printing head contacting the paper and a mechanism for idling the printing head so that it will cease to advance as soon as it contacts the paper. Therefore, the system architecture is inevitably complicated.

OBJECTS AND SUMMARY OF THE INVENTION

It is an object of the present invention to provide a compact precision displacement sensor capable of providing a linear PSD signal output proportional to the amount of displacement of the object.

It is another object of the invention to provide a compact precision positioning device which does not require positional setting in assembling.

The displacement sensor of the present invention comprises a light-emitting element for projecting a detection light in a substantially perpendicular direction towards an object, a condenser element for condensing a reflected light from said object and a position sensitive device with its light-receiving surface being disposed in parallel with the light axis of said detection light.

As an alternative, said condenser element may be disposed with its light axis normal to the axis of said detection light and the reflected light condensed by a condenser element is focused on the light-receiving surface of said position sensitive device.

The positioner of the present invention comprises said light-emitting element, condenser element and PSD as integrally mounted on a single chassis to constitute a distance sensor.

In the displacement sensor of the invention where the light-receiving surface of the PSD is in parallel with the axis of detection light, the PSD signal output is linearly proportional to the amount of displacement of the object. As a result, it is no longer necessary to provide a correcting circuit for PSD signal output. Moreover, the accuracy of detection is improved.

The light-emitting element projects a detection light perpendicularly towards the object so that the sensor can be made compact.

Moreover, the resolution of the displacement sensor is increased when said condenser element is disposed with its light axis normal to the axis of said detection light and the reflected light condensed by said condenser element is focused on the light-receiving surface of the PSD.

The positioner of the invention which employs the above displacement sensor is simple and compact in construction and, yet, features high accuracy. Moreover, since the light-emitting element, condenser element and PSD are integrated with a chassis such as a heat sink and stem, the relationship between distance and output is prefixed so that assembling of this positioner with an optical/magnetic disk or the like does not require initial positioning. Moreover, since the distance to object can be directly measured, the detection error is small and positioning can be effected with greater accuracy.

BRIEF DESCRIPTION OF THE DRAWINGS

FIGS. 3(a), (b) each is a view showing the procedure for determining the above relationship;

DESCRIPTION OF THE PREFERRED EMBODIMENT

Figure 1:
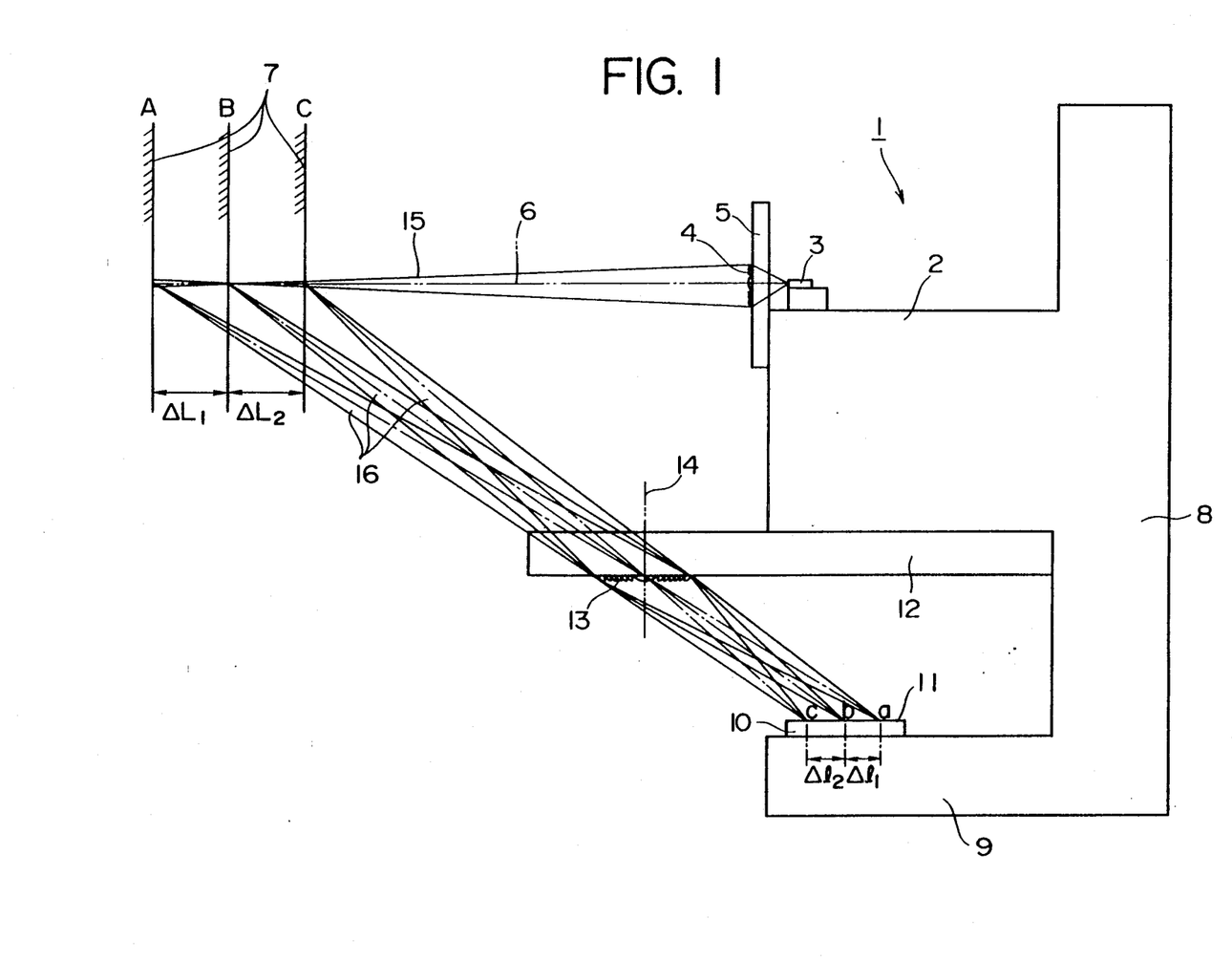
FIG. 1 is a side elevation view showing a displacement sensor as a first embodiment of the invention.

Referring to FIG. 1 which shows a displacement sensor 1 as a first embodiment of the invention, a light-emitting element 3, which may be a semiconductor laser or a light-emitting diode, is mounted on top of a heat sink block 2, while a lens mount 5 carrying a Fresnel lens 4 for projection is secured to the front side of the heat sink block 2. The above light-emitting element 3 is disposed on the light axis 6 of the Fresnel lens 4 so that the light from the light-emitting element 3 is converged by the Fresnel lens 4 and projected perpendicularly towards an object 7. A base plate 8 carrying said heat sink block 2 has a PSD mount 9 projecting out under said heat sink block 2 and a PSD 10 is mounted on this PSD mount 9 with its light-receiving surface 11 in parallel with the light axis 6 of the Fresnel lens 4. Affixed to the underside of said heat sink block 2 is a transparent lens base 12 of optical resin. A transmission condenser Fresnel lens 13 is disposed on the underside of a forward portion of the lens base 12 which is projecting beyond the front side of the heat sink block 2. In this embodiment, the light axis 14 of the condensing Fresnel lens 13 is normal to the light axis of the projecting Fresnel lens 4 and the light-receiving surface 11 of PSD 10, and the distance from the projecting Fresnel lens 4 to the point at which an extension of the straight line connecting the PSD 10 to the condenser Fresnel lens 13 intersects the light axis 6 of the projecting lens 4 approximates the desired range of detection. The light beam emergent from the optical axis 6 of the projecting lens 4 is condensed by the condenser 13 and focused on the light-receiving surface 11 of the PSD 10. In other words, the point light source on the light axis 6 is focused on the light-receiving surface 11.

It should be understood that the stem, cap and other parts of the apparatus are not shown in FIG. 1.

The detection light 15 from the light-emitting element 3 is converged by the projector Fresnel lens 4 and projected on the surface of the object 7. The reflected light 16 is condensed by the condenser 13 and focused on the light-receiving surface 11 of the PSD 10. As a result, the PSD 10 detects the position of focus (point of incidence) of reflected light 16 and, hence, the amount of displacement (or detection distance) of the object 7. For example, reflected rays 16 from the surfaces of object 7 at A, B and C are focused at a, b and c, respectively, of the light-receiving surface 11 and the amounts of displacement $\Delta L_1$ and $\Delta L_2$ can be found from the distance $\Delta l_1$ between positions a and b and the distance $\Delta l_2$ between positions b and c, respectively.

Since the axis 6 of detection light 15 (light axis of the projector Fresnel lens 4) is parallel to the light-receiving surface 11 of the PSD 10 in this invention, the amount of displacement $\Delta L_1$, $\Delta L_2$ of the object 7 is proportional to the amount of displacement of the focus on the light-receiving surface 11.

$$\Delta l_1 : \Delta l_2 = \Delta L_1 : \Delta L_2$$

Thus, of the reflected light rays 16 from the object 7, the center ray of the beam passing through the condenser Fresnel lens 13 (indicated by the dot-chain line) travels straight through the lens 13. Therefore, the amount of displacement of focus on the light-receiving surface 11 is proportional to the amount of displacement of the object 7 as will be apparent from FIG. 1. Therefore, the present invention offers a good linearity between PAD signal output and detection distance, making is possible to fabricate a high-accuracy displacement sensor.

Furthermore, since in this embodiment the light axis of the condenser Fresnel lens 13 is normal to the light axis 6 of the projector Fresnel lens 4 and the light-receiving surface 11 of the PSD 10, the PSD 10 can be located in such a position that the reflected light 16 from the object 7 is always focused on the light-receiving surface 11, so that both the resolution of the PSD 10 and the accuracy of detection are improved.

Figure 2:
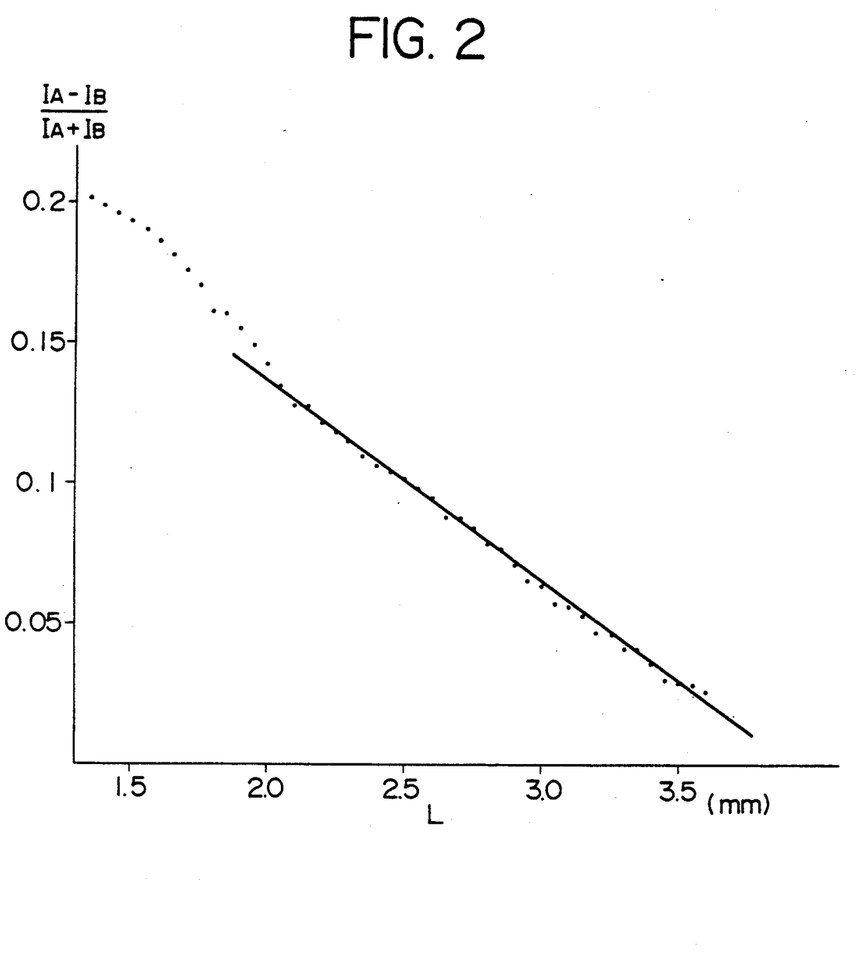
FIG. 2 is a diagram showing the relationship between detection distance and PSD signal output in the same displacement sensor.
Figure 3:
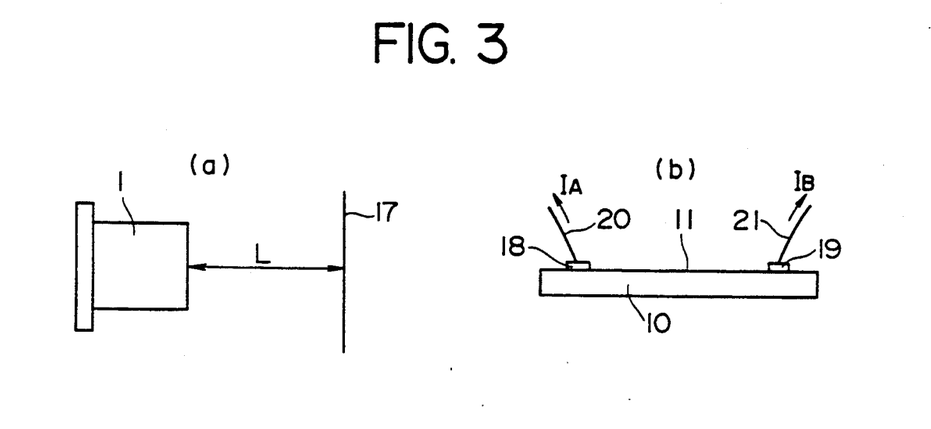

FIG. 2 shows the relationship between detection distance L and PSD signal output as plotted using the above displacement sensor 1. The horizontal axis represents the detection distance L which was measured by erecting an uncoated paper sheet 17 in front of the displacement sensor 1 and measuring the distance from the projector Fresnel lens 4 to the paper sheet 17. The vertical axis of FIG. 2 represents the PSD signal output which was the value $(I_A - I_B)/(I_A + I_B)$ found by dividing the difference $(I_A - I_B)$ between the currents $I_A$ and $I_B$ flowing through lead wires 20, 21 connected to two electrodes 18, 19 of the PSD 10, as shown in FIG. 3 (b), by the total current $(I_A + I_B)$. As shown in FIG. 2, the relationship between detection distance L and PSD signal output showed good linearity, particularly over the range of L=2.0-3.6 mm.

To increase the detection distance L, it is sufficient to reduce the angle which the direction from the condenser Fresnel lens 13 to the light-receiving surface 11 of the PSD 10 makes with the light axis 6 of the projector Fresnel lens 4, with the result that the bulk of the displacement sensor 1 need not be increased.

Figure 4:
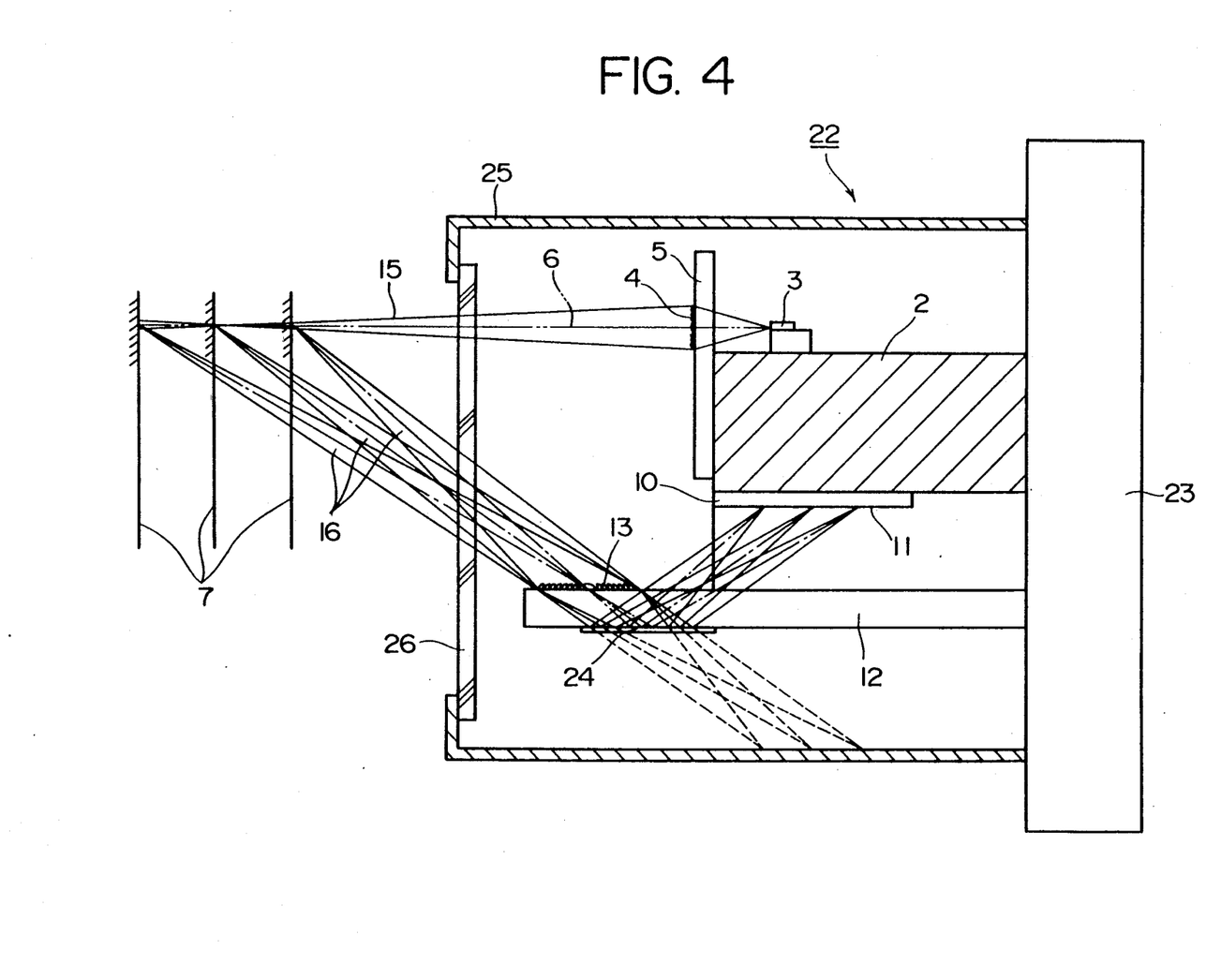
FIG. 4 is a sectional view showing a displacement sensor as a second embodiment of the invention.

FIG. 4 is a sectional elevation view showing a displacement sensor as a second embodiment of the invention. In this displacement sensor 22, a heat sink block 2 is secured to the front side of a stem 23 and a light-emitting element 3 is mounted on top of the heat sink block 2. A lens mount 5 carrying a projector Fresnel lens 4 is secured to the front side of said heat sink block 2. Secured to the underside of the heat sink block 2 is a PSD 10 with its light-receiving surface 11 facing downwards and extending in parallel with the axis of detection light 15. Disposed below the heat sink block 2 is a transparent lens base 12 in face-to-face relation with the PSD 10 and a condenser Fresnel lens 13 is mounted on said lens base 12 in such a manner that the light axis of the condenser Fresnel lens 13 is normal to the light axis 6 of the projector Fresnel lens 4. The underside of the lens base 12 is formed with a reflective surface 24 in parallel with the condenser Fresnel lens 13. This displacement sensor 22 is covered with a cap 25 as secured to the stem 23 and the window of the cap 25 is paned with sheet glass 26.

The detection light 15 from the light-emitting element 3 is reflected by the surface of object 7 and the reflected light 16 is condensed by the Fresnel lens 13, then reflected upwards by the reflective surface 24 and focused on the light-receiving surface 11 of the PSD 10.

In this embodiment, too, the reflected light 16 is focused on the light-receiving surface 11 of PSD 10, regardless of detection distance. Moreover, since the amount of displacement of the focus on the light-receiving surface 11 is proportional to the amount of displacement of the object 7, an excellent linearity of PSD signal output can be obtained. Moreover, since the PSD 10 can be affixed to the underside of a heat sink block 2 prior to mounting of the lens base 12, wire bonding of the PSD 10 is facilitated.

Figure 5:
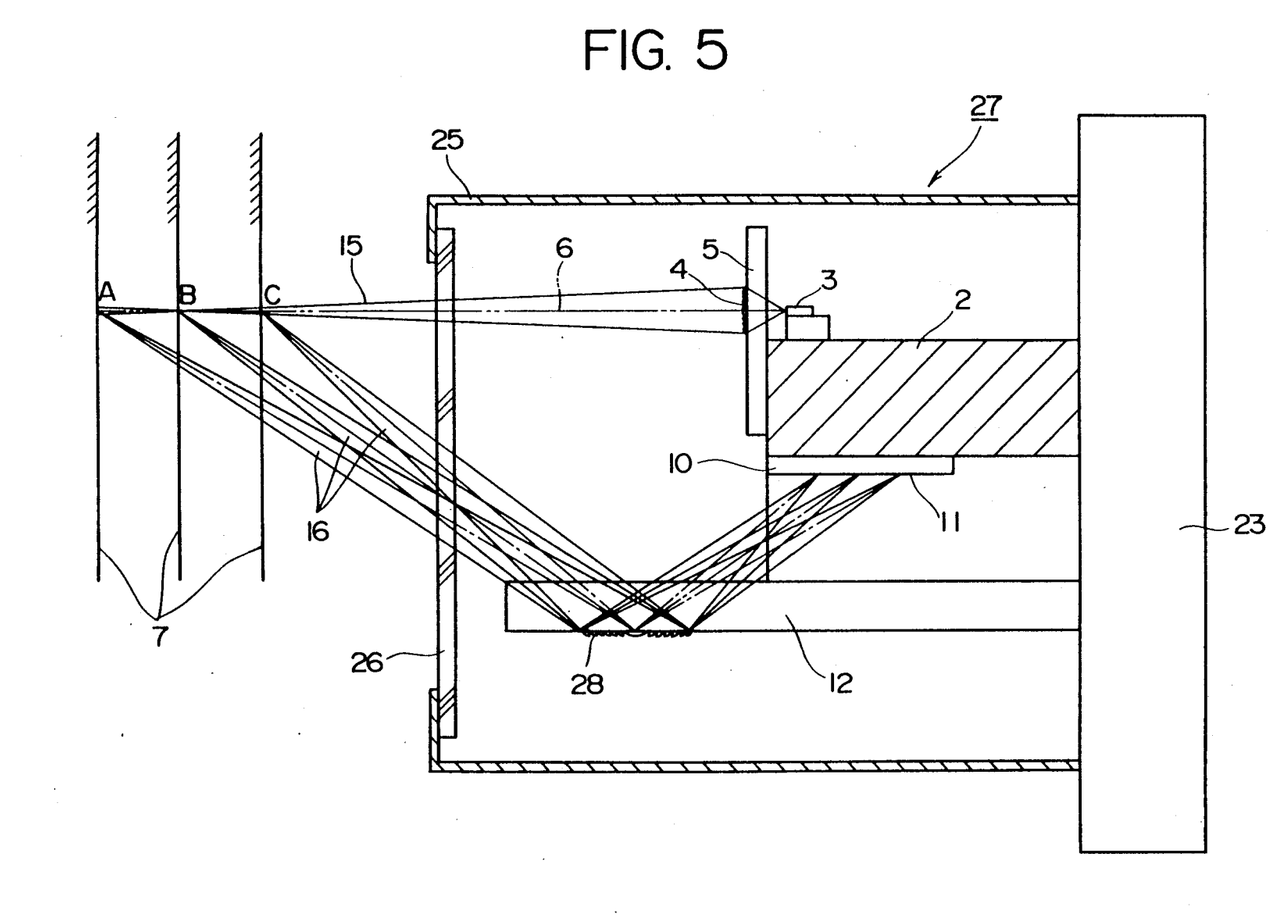
FIG. 5 is a sectional view showing a displacement sensor as a third embodiment of the invention.

FIG. 5 is a sectional elevation view showing a displacement sensor as a third embodiment of the invention. A light-emitting element 3 is mounted on top of a heat sink block 2 secured to the front side of a stem 23 and a lens base 5 carrying a projecting Fresnel lens 4 is secured to the front side of said heat sink block 2. Secured to the underside of the heat sink block 2 is a PSD 10 with its light-receiving surface 11 facing downwards and extending in parallel with the light axis 6 of the projector Fresnel lens 4. Below the heat sink block 2 is a transparent lens base 12 in face-to-face relation with the PSD 10. Secured to the underside of the lens base 12 is a reflecting Fresnel lens 28, the light axis of which is normal to the light axis 6 of the projector Fresnel lens 4.

The reflected light 16 from the object 7 is reflected upwards and condensed by the reflecting Fresnel lens 28 and focused on the light-receiving surface 11 of the PSD 10. In this embodiment, too, the wire bonding of the PSD 10 is facilitated when the lens base 12 is attached afterwards.

Figure 6:
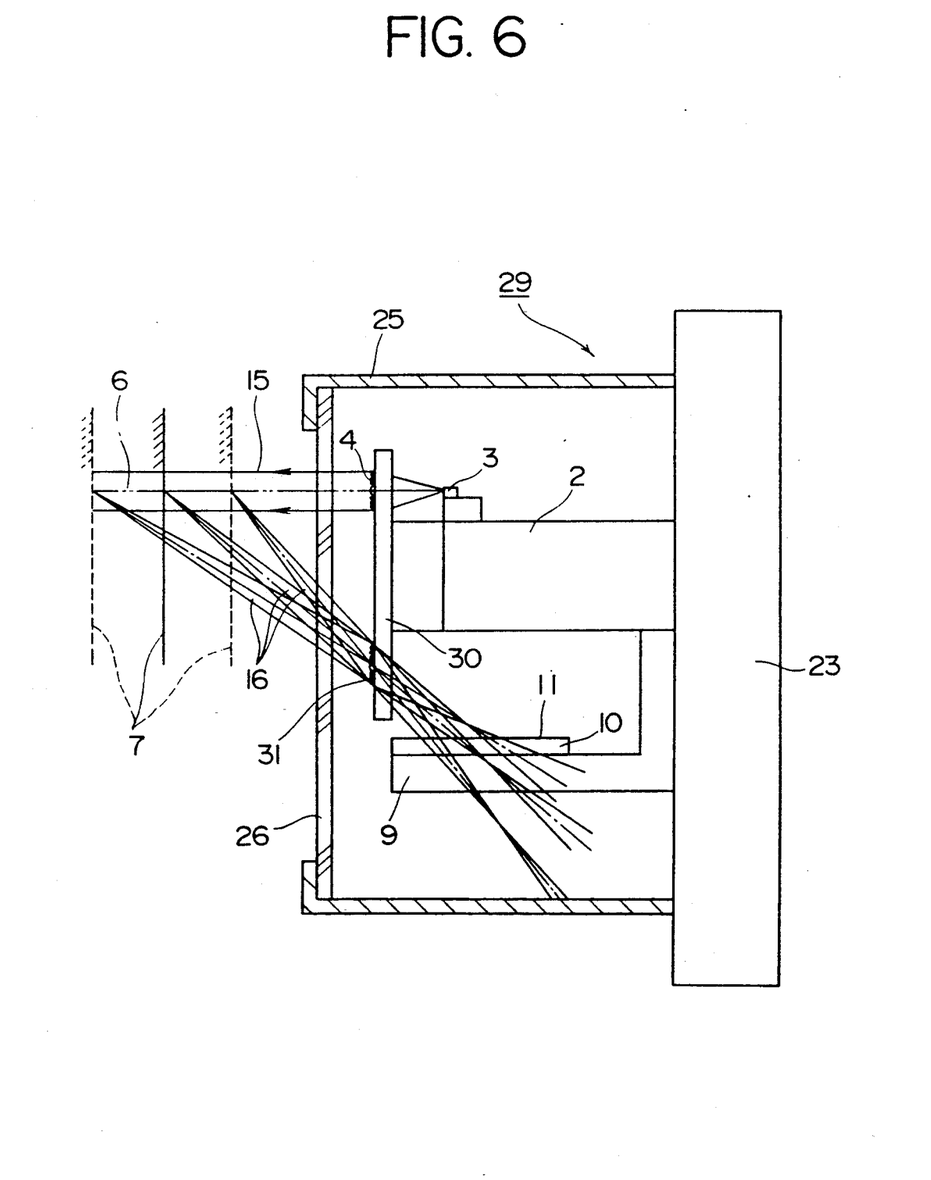
FIG. 6 is a sectional view showing a displacement sensor as a fourth embodiment of the invention.

FIG. 6 shows a displacement sensor 29 as a fourth embodiment of the invention. This embodiment includes a vertically elongated transparent lens base 30 secured to the front face of a heat sink block 2 carrying a light-emitting element 3. The lens base 30 carries a projecting Fresnel lens 4 on the forward side thereof in juxtaposition with the light-emitting element 3 and a condensing Fresnel lens 31 under the projector lens 4. A PSD 10 is mounted on a PSD mount 9 located below the heat sink block 2, with its light-receiving surface 11 facing upwards. Thus, in this embodiment the light-receiving surface 11 of the PSD 10 is parallel to the light axis 6 of the projector Fresnel lens 4 and the light axis of the condenser Fresnel lens 31 is also parallel to the light axis 6 of the projector Fresnel lens 4.

In this embodiment, the light axis of the condenser Fresnel lens 31 is not normal but parallel to the axis 6 of the detection light 15. Therefore, unlike the first embodiment, it is not that the reflected light is always focused on the light-receiving surface 11 of the PSD regardless of the position of the object 7 but since the light-receiving surface 11 of PSD 10 is parallel to the axis 6 of the detection light 15, the PSD signal output is linearly dependent on the amount of displacement of the object 7. Thus, referring to the center ray of the reflected light flux 16 (the light ray passing through the center of the condenser Fresnel lens 31 as indicated by the dot-chain line), the amount of displacement of the point at which the center ray of reflected light 16 crosses the light-receiving surface 11 is proportional to the amount of displacement of the object 7.

Figure 7:
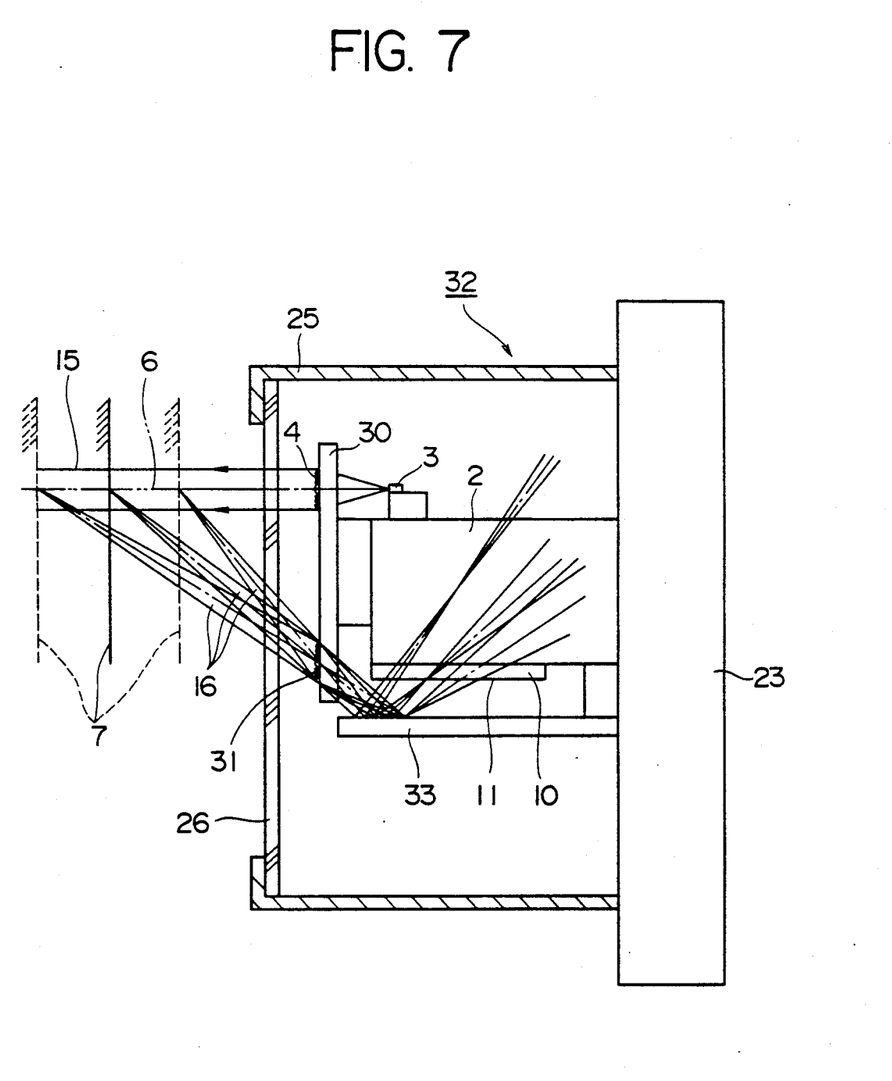
FIG. 7 is a sectional view showing a displacement sensor as a fifth embodiment of the invention.

FIG. 7 shows a displacement sensor as a fifth embodiment of the invention. In this displacement sensor 32, an elongated transparent lens base 30 secured to the front side of a heat sink block 2 carries a projecting Fresnel lens 4 and a condensing Fresnel lens 31, with the light axes of the two lenses being parallel to each other and a PSD 10 being secured to the underside of the heat sink block 2, with its light-receiving surface 11 in parallel with the axis 6 of the detection light 15. Moreover, a reflector plate 33 is disposed below the heat sink block 2 and in parallel with the light-receiving surface 11.

The reflected light 16 from the surface of object 7 is condensed by the condensing Fresnel lens 31, then reflected upwards by the reflector plate 33, and is finally incident on the light-receiving surface 11 of the PSD 10. Since, in this embodiment, too, the axis 6 of detection light 15 is parallel to the light-receiving surface 11, the PSD signal output is linearly dependent on the amount of displacement of the object 7.

Figure 8:
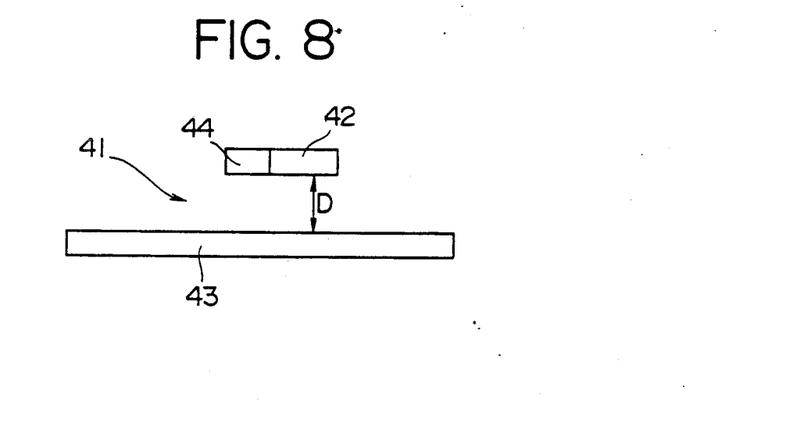
FIG. 8 is a schematic view illustrating a positioning apparatus of the invention.

FIG. 8 shows a positioning apparatus as an embodiment of the invention, employing a displacement sensor comprising said light-emitting element 3, condenser element (condensing Fresnel lens 13, reflecting Fresnel lens 28 or the like), PSD 10, stem 23, heat sink block 2 and PSD mount 9 as integrally mounted on a single chassis. This positioning apparatus 41 can be used to position an object 42 to be controlled, such as the magnetic head of a optical/magnetic disk system or the printing head of an impact dot printer, at a predetermined distance from an associated object 43 such as the disk or the printing paper. In this embodiment, the displacement sensor 44 and the object to be controlled 42 are disposed in the same plane for concerted movement. Therefore, if the distance D to the associated object 43, such as the disk or paper, is measured with the displacement sensor 44, the distance between the object 42 and the associated object 43 can be directly found. As the detection signal from the displacement sensor 44 is fed back to the object 42 to indicate the distance to the associated object 43 and the object of control 42 is accordingly driven with an appropriate actuator, the object of control 42 can be positioned at a desired distance from the object 43 with a minimum of error. This positioning apparatus is contactless, and because the sensor 44 is small, can be compactly built.

Figure 9:
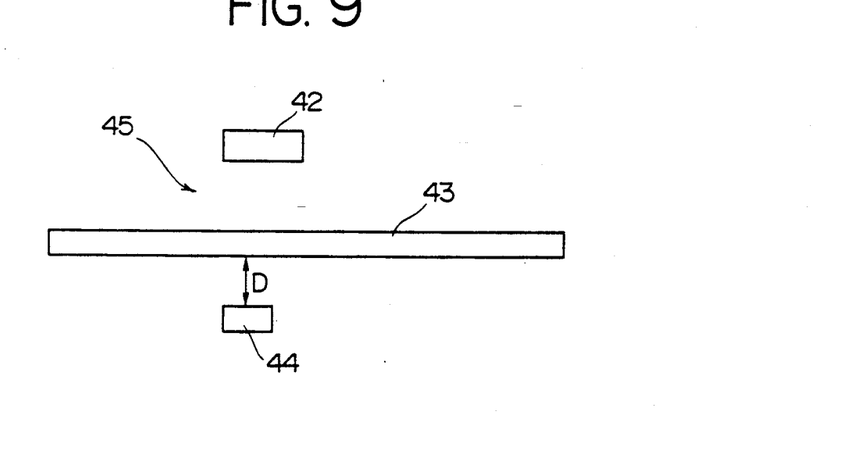
FIG. 9 is another positioning apparatus of the invention.

FIG. 9 shows another positioning apparatus 45 of the invention. In this embodiment, an object of control 42, such as a magnetic head or a printing head, and a displacement sensor 44 are disposed on respective sides of an object 43 such as the disk or the paper, and it is so arranged that the object of control 42 and the displacement sensor 44 always move at a predetermined distance therebetween. Therefore, provided that the distance between the object 42 and the sensor 44 and the thickness of the object 43 are known, the distance between the object of control 42 and the associated object 43 can be known by detecting the distance D between the displacement sensor 44 and the object 43 and the object of control 42 can be positioned to maintain this distance with high accuracy. Moreover, since this displacement sensor is integrally mounted on a chassis, the relationship between distance to object 43 and detection signal is also predetermined. Therefore, unlike the focus error system, this apparatus does not call for critical setting in the assembling stage.

The advantages of the displacement sensor may be summarized as follows.

Since the light-receiving surface of the PSD is parallel to the axis of the detection light, there can be manufactured a compact high-precision sensor which provides a linear PSD signal output relative to the displacement of an object.

In the embodiment where the condensing element has its light axis normal to the axis of said detection light, the reflected light is focused on the light-receiving surface of the PSD. Therefore, the resolution of the sensor is improved.

The positioning apparatus of the invention is compact and, yet, high in precision. As the distance to the object can be directly determined, positioning accuracy is improved with a minimum of error. Furthermore, no initial setting is required in assembling so that the whole assembly process is facilitated.

What is claimed is:

1. A sensor for detecting object displacement comprising:
    a light-emitting element for projecting a detection light along an axis towards said object in a substantially perpendicular direction, said light being reflected by said object at an oblique angle relative to said detection light axis;
    a condensing element for condensing light reflected at said oblique angle;
    a position sensitive device having a light-receiving surface disposed in parallel with said detection light axis, said position sensitive device receiving said reflected light from said condensing element at locations on said light receiving surface which represent and are proportional to the displacement of said object.

2. A displacement sensor according to claim 1 wherein said condensing element has its light axis normal to the axis of said detection light and said reflected light is condensed by said condensing element and focused on said light-receiving surface of said position sensitive device.

3. A positioning apparatus as in claim 1, wherein said condensing element has its light axis normal to the axis of said detection light and said reflected light is condensed by said condensing element and focused on said light-receiving surface of said position sensitive device.

4. A sensor as in claim 1, wherein said condensing element is a Fresnel lens and a light axis of said Fresnel lens is disposed normal to said detection light axis and to said light receiving surface.

5. A sensor as in claim 1, wherein said light emitting element comprises a light source and a light converging Fresnel lens.

6. A sensor as in claim 1, wherein said light emitting element is mounted to a support structure, said condensing lens is mounted on a transparent base connected to said support structure, and said position sensitive device is mounted to said support structure.

7. A sensor as in claim 6, wherein said condensing lens is disposed on a side of said transparent base which faces said position sensitive device.

8. A sensor as in claim 1, further comprising a reflection element for reflecting light from said condenser lens to said light receiving surface.

9. A sensor as in claim 8, wherein said condensing lens and reflection element are mounted on opposite sides of a transparent lens base.

10. A sensor as in claim 9, wherein said light emitting element and position sensitive device are mounted on opposite sides of a heat sink.

11. A sensor as in claim 1, wherein said condensing lens forms part of a reflection element for reflecting light from said condensor lens to said light receiving surface.

12. A sensor as in claim 11, wherein said light emitting element and position sensitive device are mounted on opposite sides of a heat sink.

13. A sensor as in claim 1, wherein said condensing lens is a Fresnel lens and has a light axis which is perpendicular to said light receiving surface.

14. A sensor as in claim 11, wherein light from said condensing lens directly impinges on said light receiving surface.

15. A sensor as in claim 13, further comprising a reflector for reflecting light from said condensing lens to said light receiving surface.

16. A sensor as in claim 1, wherein said reflected light strikes said light receiving surface at an oblique angle.

17. A positioning apparatus comprising:
a chassis; and
a sensor for determining displacement of an object with respect to said chassis, said sensor being mounted on said chassis and comprising:
a light-emitting element for projecting a detection light along an axis towards said object in a substantially perpendicular direction, said light being reflected by said object at an oblique angle relative to said detection light axis;
a condensing element for condensing light reflected at said oblique angle; and
a position sensitive device having a light-receiving surface disposed in parallel with said detection light axis, said position sensitive device receiving said reflected light from said condensing element at locations on said light receiving surface which represent and are proportional to the displacement of said object.

18. A positioning apparatus as in claim 17, wherein said reflected light strikes said light receiving surface at an oblique angle.

* * * * *